Sept. 13, 1927.
F. C. RYDER
1,642,045
GLARESHIELD
Filed May 25, 1926       2 Sheets-Sheet 1
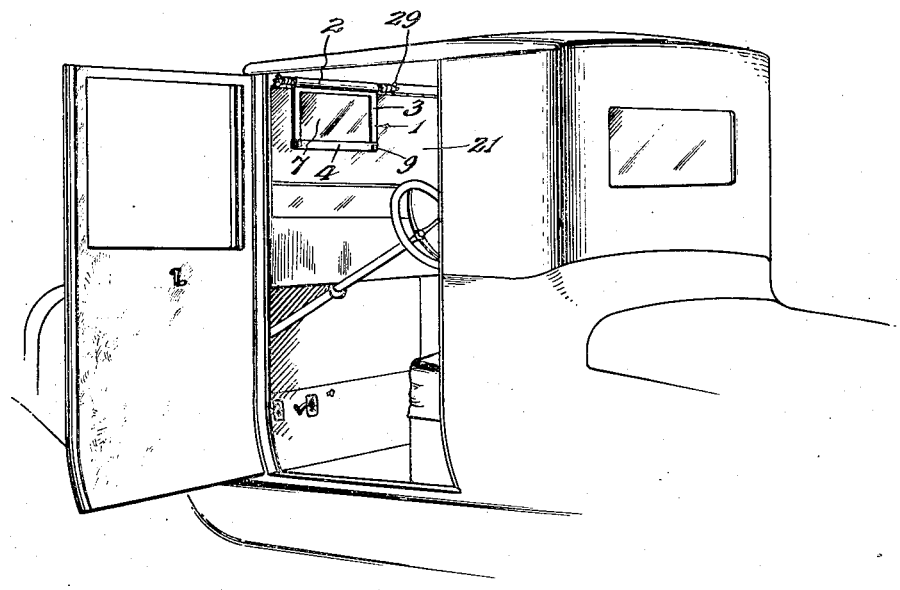
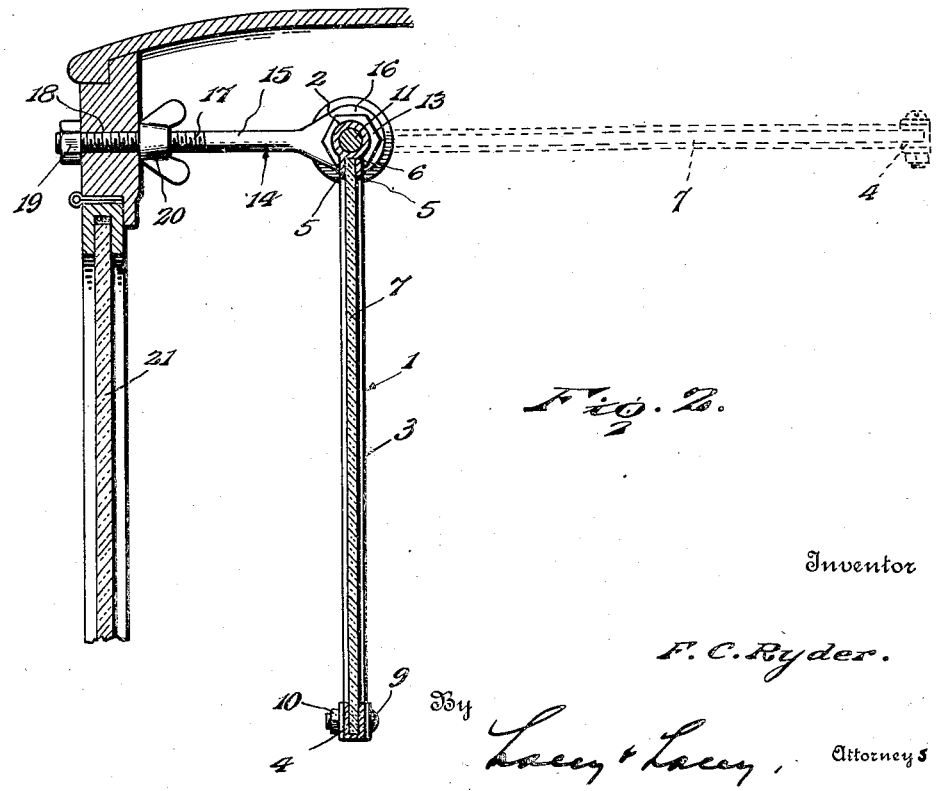
Inventor
F. C. Ryder.
By Lacey & Lacey, Attorneys Sept. 13, 1927.  
F. C. RYDER  
1,642,045  
GLARESHIELD  
Filed May 25, 1926  
2 Sheets-Sheet 2
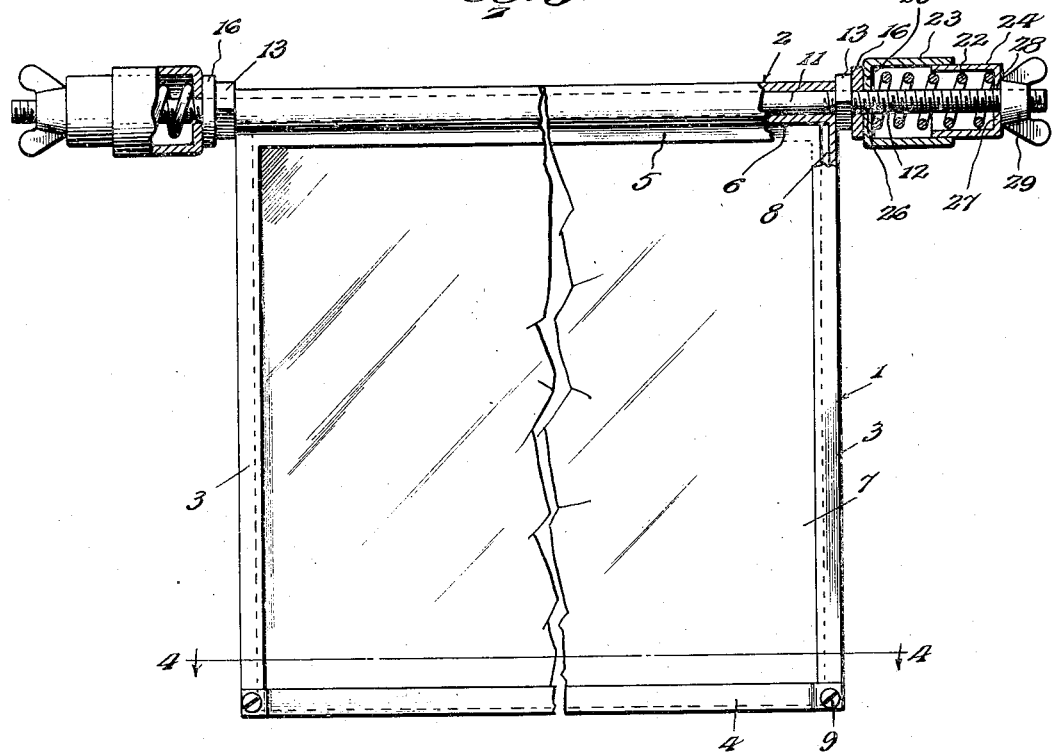
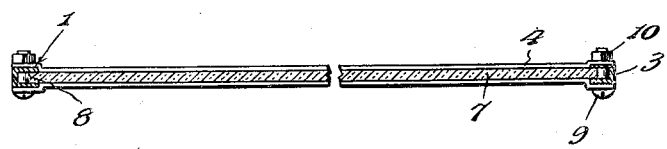
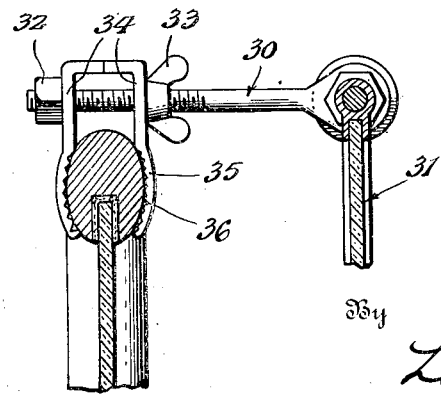
Inventor
F. C. Ryder.
By
Lacey & Lacey, Attorneys Patented Sept. 13, 1927.

1,642,045

UNITED STATES PATENT OFFICE.

FOREST C. RYDER, OF ELGIN, OREGON.

GLARE SHIELD.

Application filed May 25, 1926. Serial No. 111,595.

This invention relates to improvements in glare shields for automobiles and has as its general object to provide a glare shield which may be readily mounted upon the windshield frame of an automobile and which will effectually modify the rays from the headlights of oncoming automobiles so as to overcome the annoyance which is otherwise experienced by motorists when driving at night.

One of the important objects of the invention is to provide a glare shield so constructed that when installed upon the windshield frame of an automobile, it will not in any way interfere with the installation and operation of the windshield wiper nor with the adjustment of the upper section of the windshield in rear of which it is supported.

Another object of the invention is to provide a glare shield which will be capable of adjustment into and out of position to serve its purpose and which will be capable of such adjustment without the necessity of manipulating any mechanical adjusting devices and will be securely supported in any of its positions of adjustment and in a manner to provide against undue vibration which might prove annoying to the driver of the automobile.

In the commercial exploitation of glare shields, it has been customary to manufacture the shields, permanently arranging within the frame of each shield a pane of glass or celluloid, or other transparent material, of one color or another, and as a consequence, retail dealers are compelled to keep in stock an assortment of colors sufficient to satisfy the trade and as there is liable to be a predominant preference for one or two of a number of colors, a retail dealer will find himself over-stocked with devices of this character in which the light ray modifying panes are of undesirable or unpopular colors. Therefore, it is another object of the present invention to so construct the frame of the device that a light ray modifying pane of glass or any other transparent material may be inserted into the frame or removed therefrom, thereby permitting of a wide range of choice in the colors of the panes without the necessity of carrying a corresponding number of the devices in stock. Likewise, in this connection, the invention contemplates the substitution of a new pane for a broken one where the panes are of glass.

In the accompanying drawings:

Figure 1 is a perspective view illustrating the glare shield embodying the present invention installed within an automobile of the closed type.

Figure 2 is a detail vertical front to rear sectional view illustrating the glare shield and the manner of mounting the same, the view illustrating in full lines the glare shield in position to serve its purpose and in dotted lines, the position which will be assumed by the shield when it is not in use.

Figure 3 is a view partly in rear elevation and partly in section, illustrating the glare shield and likewise illustrating in detail the tensioning means for the shield.

Figure 4 is horizontal sectional view taken substantially on the line 4—4 of Figure 3. looking in the direction indicated by the arrows.

Figure 5 is a detail vertical sectional view similar to Figure 2, illustrating a slightly modified embodiment of the invention.

Generally speaking, the invention comprises a frame in which is mounted a colored transparent pane, and means for supporting the frame for swinging adjustment immediately in rear of the windshield pane of the automobile, so that it may occupy a position directly in the line of the driver's vision as shown in full lines in Figure 2 of the drawings, or an elevated position, as shown in dotted lines in said figure, together with means for tensioning the frame whereby to maintain it in its positions of adjustment, and in the drawings the frame is indicated in general by the reference numeral 1 and comprises a top member 2, side members 3, and a bottom member 4. The top member 2 of the frame is of tubular form, as clearly illustrated in Figures 2 and 3 of the drawings, and is provided at its under side, when the structure is in position for use, with depending parallel longitudinal flanges, indicated by the numeral 5, forming between them a channel 6 to accommodate the upper edge of the transparent pane which is indicated by the numeral 7, and which may be of glass, celluloid, or other transparent material. The side members 3 of the frame are preferably integrally formed at their upper ends with the ends of the top member 2 and extend downwardly therefrom in parallel relation to each other and are provided in their opposing sides with channels 8 to accommodate the lateral or vertical edges of the pane 7. The bottom member 4 of the frame is of channel formation and accommodates in its channel the lower edge of the said pane and at its ends accommodates the lower ends of the side members 3, bolts 9 being fitted through the said ends of the bottom member 4 and through the lower ends of the side members 3, and having nuts 10 applied thereto to connect the said frame members. At this point it will be evident that the pane 7 is firmly held within the rectangular frame and that in the event of breakage of the pane, a new one may be readily substituted therefor by removing the bolts 9 and the bottom member 4 of the frame to release the fragments of the broken pane and permit of the insertion of a new pane, after which the bottom member is, of course, replaced, as well as the securing bolts 9. It will likewise be evident, at this point, that a dealer may be supplied with panes of various colors and various materials and may fit into the frame any kind of pane selected by the purchaser.

The means for supporting the frame comprises a rod 11 which is fitted through the bore of the top member 2 of the frame and is threaded at its ends, as indicated by the numeral 12. Nuts 13 are threaded onto the said ends of the rod and are tightened to bear against the opposite ends of the top member 2 of the frame, so that the frame is thus clamped upon the said rod. The numeral 14 indicates bracket members each comprising a stem 15 having an eye 16 and a threaded end 17, and these members have their eyes applied to the threaded ends of the rod 11 in position engaging against the outer sides of the nuts 13, as clearly shown in Figure 3 of the drawings, the threaded ends 17 of the said stems being fitted through openings 18 formed in the top of the windshield frame of the automobile and secured in place by nuts 19 and 20. The nuts 19 are applied to the forward or outer ends of the stems 15 of the bracket members and are in engagement with the forward side of the top of the windshield frame of the automobile, as clearly shown in Figure 2 of the drawings, whereas the nuts 20 are preferably wing nuts and are tightened so as to bind against the inner side of the top member of the windshield frame, the bracket members 14 extending rearwardly from the said member of the windshield frame so as to suspend the frame 1 of the glare shield in spaced relation to the upper section of the windshield, as indicated by the numeral 21. It will be evident at this point that the stems of the bracket members may be of any desired length so as to support the frame of the glare shield of the invention any desired distance from the windshield of the automobile and thus the invention may be adapted to various makes of automobiles.

In order that the frame 1 may be supported in positions of adjustment and maintained against displacement, tensioning means is provided which will now be described. The said means comprises tensioning springs 22 which are arranged upon the threaded ends of the rod 11, the rod being extended at its said ends, for this purpose, beyond the eye members 16 of the supporting brackets, and each spring is housed within a housing comprising telescopic members indicated one by the numeral 23 and the other by the numeral 24. The members are of cylindrical form and the member 24 is telescopically fitted within the member 23, the said member 23 having a closed end 25 provided with an opening 26 to accommodate the respective threaded end of the rod 11, the said closed end of the said member 23 engaging against the eye 16 of the respective bracket member 14. The member 24 of each housing is closed at its outer end, as indicated by the numeral 27, and its closed end is formed with an opening 28 likewise accommodating the respective threaded end of the rod 11, and a wing nut 29 is threaded onto the said end of the rod and may be adjusted so as to suitably tension the respective spring 22, the spring bearing at its ends between the closed ends of the members of the housing. In this manner a suitable tension may be exerted upon the rod 11 so that when the frame 1 is swung to either of the positions of adjustment shown in Figure 2 of the drawings, it will maintain such position.

The embodiment of the invention above described is designed primarily for use on closed cars, where openings to accommodate the stems of the bracket members 14 may be readily drilled through the top cross piece of the windshield frame of the car, but where the invention is to be employed upon open cars, an arrangement such as shown in Figure 5 of the drawings, will preferably be employed. In this figure, the bracket members corresponding to the members 14, previously described, are indicated by the numeral 30, and the glare shield proper by the numeral 31, the bracket members being provided with nuts 32 and 33 corresponding to the nuts 19 and 20 of the previously described bracket members. In this embodiment, however, the threaded stems of the bracket members are inserted through openings in companion clamping members 34 the jaws of which, indicated by the numeral 35, are curved to adapt them to be disposed against the opposite sides of the top member of the upper section of the windshield frame of the car, the engaging faces of the said jaws being preferably provided with corrugations 36 to prevent slipping. In this embodiment, the nuts 32 and 34, of course, engage the opposite sides of the clamping members 34 and may be adjusted to secure the clamping members in place.

Having thus described the invention, what I claim is:

1. A glare shield of the class described, comprising bracket members each including attaching means and bearing portions, a rod rotatably engaged in the bearing portions, a frame including a top member supported upon the rod, means between the bearing portions and member on the rod for engagement with the top member to bind the same with the rod, a nut upon each end of the rod, tension springs upon said rod ends, and an expansible and collapsible member upon the ends of the rod and confining the springs, the ends of said members yieldably engaging, respectively, the bearing portions and nuts.

2. A glare shield of the class described comprising bracket members each including attaching means and an apertured bearing portion, a rod having threaded ends mounted in the apertures of said bearing portions, a frame including a top member supported upon the rod and extending between the said bearing portions, a nut adjustably threaded upon each end of the rod, a housing upon each end of the said rod interposed between the bearing portions of the respective bracket member and the respective nut and comprising telescopically assembled housing members one bearing against the said bearing portion of the respective bracket member and the other against the nut, and a spring housed within each of said housings and bearing between the opposite ends thereof.

3. In a glare shield of the class described, a frame comprising a top member and side members having channels in their inwardly presented sides, a light ray transmitting and modifying pane fitted at its upper and lateral margins respectively in the channels of the top and side members of the frame, and a bottom member for closing the lower side of the frame having a channel accommodating the lower margin of the pane, and means detachably connecting the ends of said bottom member with the lower ends of the side members of the frame.

In testimony whereof I affix my signature.

FOREST C. RYDER. [L. S.]